(12) United States Patent
Kondou et al.

(10) Patent No.: US 8,958,197 B2
(45) Date of Patent: Feb. 17, 2015

(54) ELECTRODE FOR CAPACITOR, PROCESS FOR PRODUCING SAME, AND CAPACITOR INCLUDING THE ELECTRODE

(75) Inventors: Keiichi Kondou, Hyogo (JP); Hideki Shimamoto, Kyoto (JP); Yukihiro Shimasaki, Hyogo (JP); Tomohiro Okuzawa, Osaka (JP)

(73) Assignee: Panasonic Corporation, Osaka (JP)

( * ) Notice: Subject to any disclaimer, the term of this patent is extended or adjusted under 35 U.S.C. 154(b) by 122 days.

(21) Appl. No.: 13/583,959

(22) PCT Filed: Mar. 28, 2011

(86) PCT No.: PCT/JP2011/001804
§ 371 (c)(1),
(2), (4) Date: Sep. 11, 2012

(87) PCT Pub. No.: WO2011/121967
PCT Pub. Date: Oct. 6, 2011

(65) Prior Publication Data
US 2013/0003260 A1  Jan. 3, 2013

(30) Foreign Application Priority Data

Mar. 30, 2010 (JP) .................................. 2010-078451

(51) Int. Cl.
| H01G 9/00 | (2006.01) |
| H01G 11/70 | (2013.01) |
| H01G 11/28 | (2013.01) |
| H01G 11/50 | (2013.01) |
| H01G 11/06 | (2013.01) |
| H01G 11/68 | (2013.01) |

(52) U.S. Cl.
CPC ............... *H01G 11/70* (2013.01); *H01G 11/50* (2013.01); *H01G 11/06* (2013.01); *H01G 11/68* (2013.01); *H01G 11/28* (2013.01); *Y02T 10/7022* (2013.01); *Y02E 60/13* (2013.01)
USPC ........................................................ 361/502

(58) Field of Classification Search
CPC ......... H01G 9/00; H01G 11/66; H01G 11/68; H01G 11/70
USPC .......................................... 361/502; 29/25.03
See application file for complete search history.

(56) References Cited

U.S. PATENT DOCUMENTS

| 5,620,813 A | 4/1997 | Lee et al. |
| 6,787,266 B1 | 9/2004 | Hashimoto et al. |
| 7,382,602 B2 * | 6/2008 | Sakata et al. .................. 361/502 |

(Continued)

FOREIGN PATENT DOCUMENTS

| EP | 1244168 | 9/2002 |
| EP | 1833065 | 9/2007 |

(Continued)

OTHER PUBLICATIONS

International Search Report of PCT Application No. PCT/JP2011/001804 dated Jun. 14, 2011.

(Continued)

*Primary Examiner* — Dion R Ferguson
(74) *Attorney, Agent, or Firm* — Panasonic Patent Center

(57) ABSTRACT

An electrode for capacitor includes a current collector having conductivity, a protective layer formed on the current collector, an anchor coat layer formed on the protective layer, and a polarizing electrode layer formed on the anchor coat layer. The protective layer contains an oxyhydroxide and the anchor coat layer contains conductive particles.

14 Claims, 5 Drawing Sheets

(56) References Cited

U.S. PATENT DOCUMENTS

| | | | |
|---|---|---|---|
| 2003/0086238 A1 | 5/2003 | Bendale et al. | |
| 2003/0086239 A1 | 5/2003 | Bendale et al. | |
| 2004/0090736 A1 | 5/2004 | Bendale et al. | |
| 2004/0191633 A1* | 9/2004 | Johnson et al. | 429/246 |
| 2007/0247788 A1 | 10/2007 | Sakata et al. | |
| 2009/0154062 A1 | 6/2009 | Yamada et al. | |
| 2010/0021807 A1* | 1/2010 | Lee et al. | 429/129 |

FOREIGN PATENT DOCUMENTS

| | | |
|---|---|---|
| JP | 07-135023 | 5/1995 |
| JP | 2000-048822 | 2/2000 |
| JP | 2000-156328 | 6/2000 |
| JP | 2003-331849 | 11/2003 |
| JP | 2005-509284 | 4/2005 |
| JP | 2007-227733 | 9/2007 |
| JP | 2008-010856 | 1/2008 |
| JP | 2008-060308 | 3/2008 |
| WO | 2006/070617 | 7/2006 |
| WO | 2008/070059 | 6/2008 |

OTHER PUBLICATIONS

The Extended European Search Report dated Dec. 4, 2014 for the related European Patent Application No. 11762216.7.

* cited by examiner elapsed time after passing through corona discharge treatment unit (min.)

ELECTRODE FOR CAPACITOR, PROCESS FOR PRODUCING SAME, AND CAPACITOR INCLUDING THE ELECTRODE

TECHNICAL FIELD

The present invention relates to an electrode for capacitor used in various electronic devices, electric devices, industrial devices, automobiles, and the like, and a process for producing the electrode, and a capacitor including the electrode.

BACKGROUND ART

In recent years, in view of environmental protection, capacitors used for assisting power at the time of activating a vehicle, a construction machine, and the like have been developed. For capacitors for this purpose, there have been demands for increasing an electric capacity per unit volume and for reducing an internal resistance. That is, a large energy density and a high power density have been demanded.

In order to reduce the internal resistance of a capacitor so as to satisfy these demands, it is essential to provide a structure that has high adhesion between a current collector and a polarizing electrode material. As the polarizing electrode material, carbon-based powder particles having high conductivity, such as activated carbon, are generally used.

For example, Patent Literature 1 discloses an electrode for capacitor in which the adhesion between the current collector and the polarizing electrode material is enhanced. FIG. 8 is a cross-sectional view showing an electrode for capacitor in Patent Literature 1.

The electrode includes current collector 101, polarizing electrode layer 102 and anchor coat layer 103 formed on current collector 101. Anchor coat layer 103 is formed of conductive particles (for example, carbon black) and a binder, and is provided between current collector 101 and polarizing electrode layer 102. According to this structure, particles of carbon black in anchor coat layer 103 provided between current collector 101 and polarizing electrode layer 102 are thrust into fine voids of polarizing electrode layer 102. Due to an anchor effect obtained by this structure, a joining strength of polarizing electrode layer 102 to current collector 101 is improved.

Moreover, anchor coat layer 103 is provided so as to embed gaps that exist between current collector 101 and polarizing electrode layer 102. For this reason, the volume of the gaps located between current collector 101 and polarizing electrode layer 102 can be made smaller. As a result, the adhesion of polarizing electrode layer 102 to current collector 101 is improved. Thus, it becomes possible to reduce the internal resistance of the capacitor.

However, even if the electrode for capacitor having the above structure is used, the internal resistance is not sufficiently reduced. In particular, in order to quickly charge/discharge a large quantity of electricity as a capacitor for assisting power of a vehicle or a construction device, the resistance between current collector 101 and polarizing electrode layer 102 needs to be further reduced.

Moreover, upon repeating charging/discharging processes as a capacitor, pH of the electrolytic solution is changed, with the result that acid or alkali accumulated in the electrolytic solution during this time comes to react with current collector 101 to cause corrosion therein. This corrosion is one factor of an increase in the internal resistance of the electrode for capacitor.

CITATION LIST

Patent Literature

PTL 1: Unexamined Japanese Patent Publication No. 2007-227733

SUMMARY OF THE INVENTION

The present invention provides an electrode for capacitor capable of reducing direct current resistance and superior in corrosion resistance, and a capacitor that can reduce internal resistance by using the electrode for capacitor, and has high reliability. The electrode for capacitor of the present invention includes a current collector having conductivity, a protective layer formed on the current collector, an anchor coat layer formed on the protective layer, and a polarizing electrode layer formed on the protective layer. The protective layer contains an oxyhydroxide, and the anchor coat layer contains conductive particles. With this structure, adhesion between the current collector and the polarizing electrode layer can be improved, and the surface of the current collector can be prevented from being subjected to corrosion by acid and alkali, and consequently, the internal resistance is reduced, and a capacitor having high reliability is provided.

DESCRIPTION OF EMBODIMENTS

Figure 1:
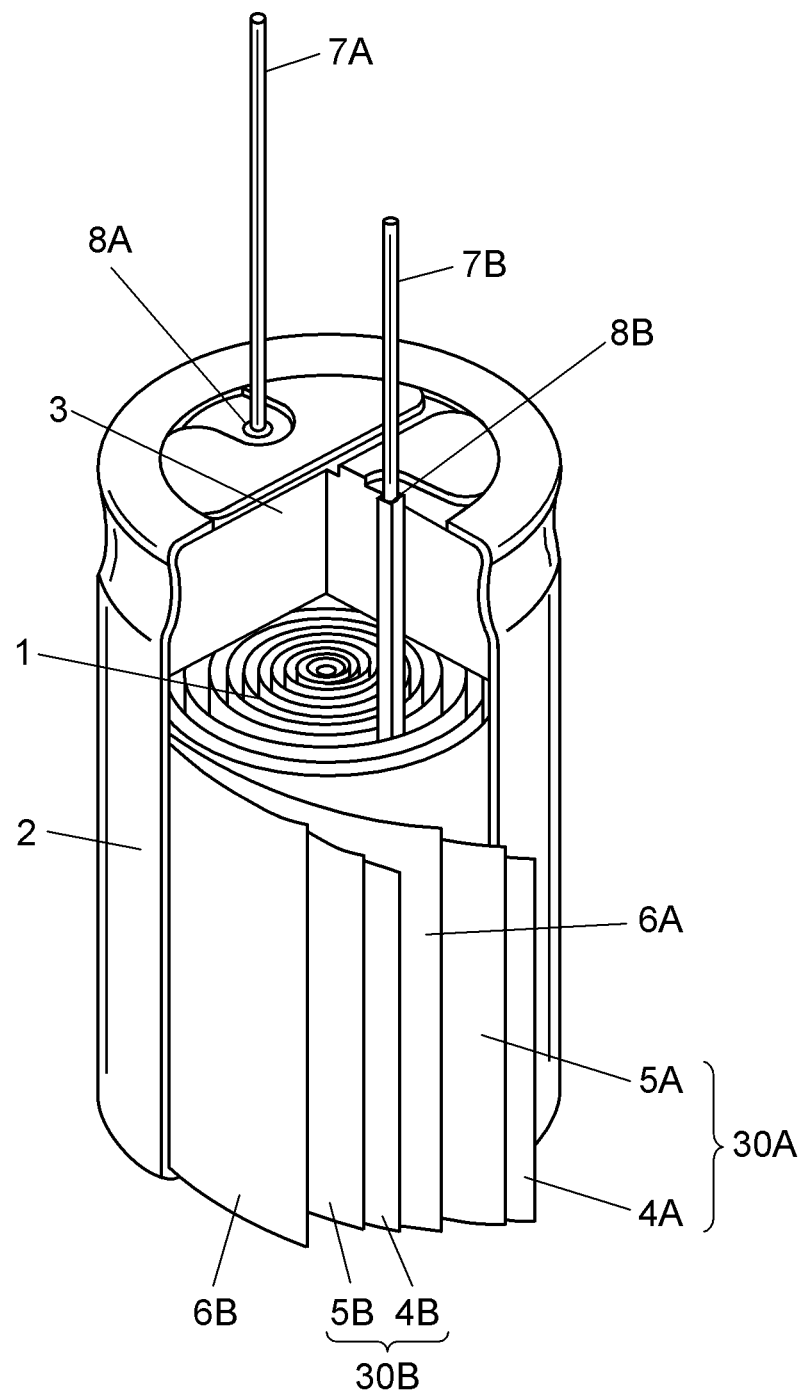
FIG. 1 is a partially cut-away perspective view of a capacitor including an electrode for capacitor according to an exemplary embodiment of the present invention.

FIG. 1 is a partially cut-away perspective view of a capacitor including an electrode for capacitor according to an exemplary embodiment of the present invention. First, referring to FIG. 1, the following description will discuss one example of a capacitor including the electrode for capacitor of the present exemplary embodiment. The capacitor includes capacitor element 1, an electrolytic solution (not shown) with which at least capacitor element 1 is impregnated, case 2 and sealing member 3.

Case 2 having a cylindrical shape with a bottom is made of aluminum. Case 2 houses capacitor element 1 and the electrolytic solution. Sealing member 3 made of rubber is fitted to an opening of case 2. In other words, sealing member 3 seals the opening of case 2. A portion near an edge of the opening of case 2 is subjected to drawing treatment, and by compressing sealing member 3 inward, case 2 is firmly sealed. Case 2 and sealing member 3 constitute an outer packaging body used for housing capacitor element 1 and the electrolytic solution.

Capacitor element 1 is formed by winding positive electrode 30A, negative electrode 30B, and separators 6A and 6B interposed between positive electrode 30A and negative electrode 30B. Positive electrode 30A includes current collector 4A and polarizing electrode layer 5A, and negative electrode 30B includes current collector 4B and polarizing electrode layer 5B.

Current collector 4A is connected to lead wire 7A, and current collector 4B is connected to lead wire 7B. Lead wires 7A and 7B are respectively inserted into hole 8A and hole 8B formed in sealing member 3, and drawn outside. With this structure, capacitor element 1 is electrically connected to the outside circuit.

In the present exemplary embodiment, positive electrode 30A and negative electrode 30B of capacitor element 1 can be connected to the outside circuit by using lead wires 7A and 7B as described above. Alternatively, for example, sealing member 3 may be made of aluminum similarly to case 2, and current collector 4A of capacitor element 1 may be made in contact with sealing member 3, while current collector 4B may be made in contact with case 2. With this structure, sealing member 3 and case 2 may be used as external terminals for capacitor element 1. In this case, by interposing an insulating member, such as rubber or the like, between sealing member 3 and case 2, sealing member 3 and case 2 are insulated from each other.

The electrolytic solution is prepared by dissolving a solute in an organic solvent so as to have a predetermined concentration. For example, to a solvent in which ethylene carbonate (EC) and dimethyl carbonate (DMC) are mixed at a ratio of 1:1, ethyldimethyl imidazolium tetrafluorophosphate (EDMI.$BF_4$) serving as a solute is added to be contained therein at a concentration of 1.0 mol/l. Alternatively, a quaternary ammonium salt having a plurality of substituents added to a nitrogen atom, such as tetraethyl ammonium, ethyltrimethyl ammonium, or the like, an onium salt of a phosphorus atom, sulfur atom, or the like, amidine-type salt, and a spiro-type salt such as spiro-(1,1')-bipyrolidinium may be used as the solute. As the solvent, carbonates such as propylene carbonate, and lactones such as γ-butyrolactone may also be used.

Figure 2:
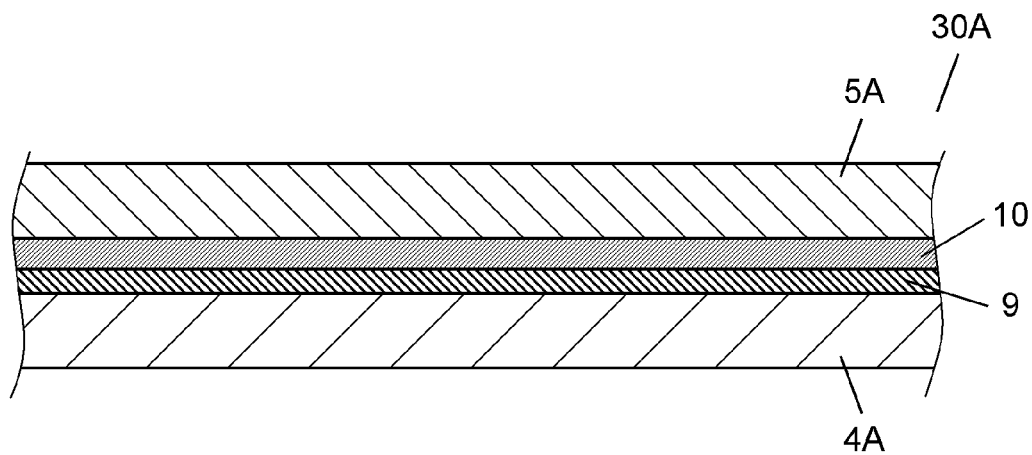
FIG. 2 is a schematic sectional view showing the electrode for capacitor according to the exemplary embodiment of the present invention.
Figure 3:
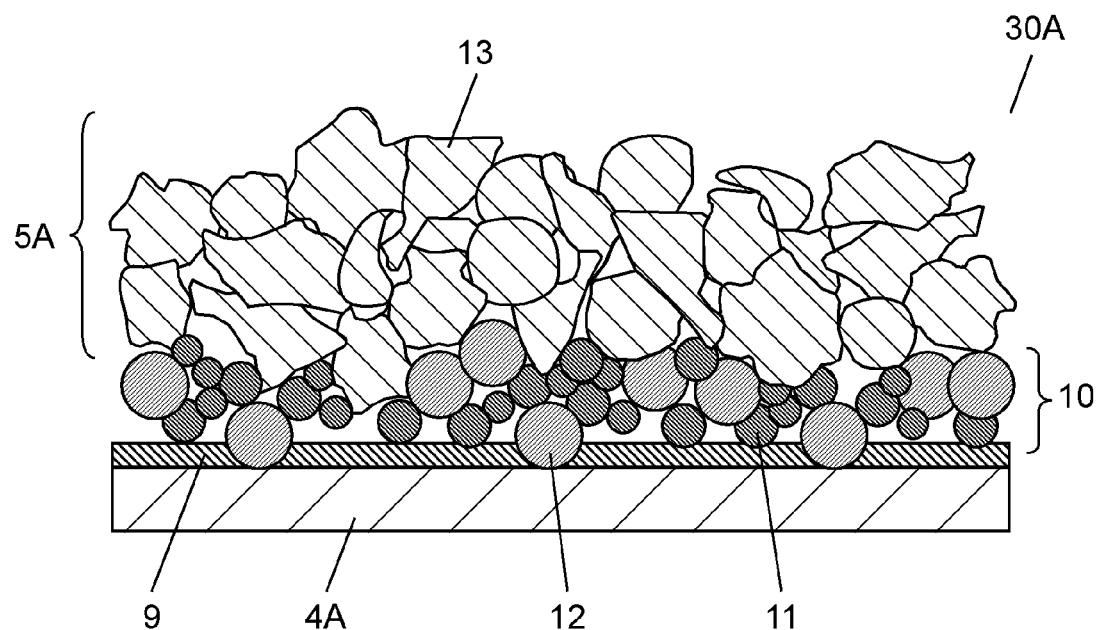
FIG. 3 is an enlarged sectional view showing the electrode shown in FIG. 2.

Next, referring to FIGS. 2 and 3, the following description will discuss an electrode for capacitor which is the technical features of the present exemplary embodiment, that is, structures of current collector 4A, polarizing electrode layer 5A and the boundary portion therebetween. FIG. 2 is a schematic sectional view showing an appearance of the structure of the electrode for capacitor according to the present exemplary embodiment, and FIG. 3 is an enlarged sectional view thereof. In FIG. 3, for convenience of illustration to improve understanding of states of the electrode for capacitor in the present exemplary embodiment, dimensions of particles of activated carbon 13 and conductive particles 11 are shown by using scales different from the actual dimensions.

Moreover, in the following description, current collector 4A and polarizing electrode layer 5A forming positive electrode 30A as the electrode for capacitor of the present exemplary embodiment and the structures of boundary therebetween will be described. Current collector 4B and polarizing electrode layer 5B forming negative electrode 30B and the boundary therebetween have the same structures. Moreover, in the following description, only one of the surfaces of the electrode for capacitor will be described, however, the following structure may be used for both of the surfaces.

As shown in FIG. 2, positive electrode 30A is formed of current collector 4A, polarizing electrode layer 5A, protective layer 9 containing an oxyhydroxide formed by modifying the surface of current collector 4A, and anchor coat layer 10. Protective layer 9 and anchor coat layer 10 are interposed between current collector 4A and polarizing electrode layer 5A.

A sheet-shaped metal plain foil having a smooth surface may be used as current collector 4A. In the present exemplary embodiment, a description will be given by exemplifying a plain foil made of aluminum. Other than aluminum, other metals, such as copper, stainless steel, titanium, and the like may be used. Moreover, an effect of the present invention can be obtained by using, in addition to the plain foil, a foil or the like having a roughened surface. As the process for roughening the surface, etching, sandblasting or the like is proposed. However, in the case where thin anchor coat layer 10 is formed, as will be described later, a plain foil is desirably used as current collector 4A.

Protective layer 9 is formed by modifying the surface of current collector 4A and by causing modified current collector 4A to react with moisture. For this reason, the oxyhydroxide contained in protective layer 9 is a compound generated from the metal forming current collector 4A.

Metal (in particular, valve metal) to be used for current collector 4A has a metal compound such as a naturally oxidized coat film originally formed on its surface. In contrast, upon generating an oxyhydroxide contained in protective layer 9, bonds between metal atoms and other different atoms such as oxygen atoms or molecules, both forming this metal compound, is broken. By making such chemically activated (unstable) metal atoms in contact with moisture, the oxyhydroxide is formed.

More specifically, for example, first, current collector 4A is subjected to corona discharge treatment. Thereafter, by making moisture in contact with current collector 4A, protective layer 9 is formed. For example, immediately after current collector 4A has been subjected to the corona discharge treatment, protective layer 9 is formed on current collector 4A by applying thereto a paste of anchor coat layer 10 with water used as solvent. The thickness of protective layer 9 thus formed is, for example, 20 nm on average.

Protective layer 9 is formed over the entire surface of current collector 4A. In the case where current collector 4A is made of aluminum, the oxyhydroxide contained in protective layer 9 is a compound represented by a composition formula, $Al_xO_Y(OH)_Z$ (where X, Y, and Z are any natural numbers). As one example of $Al_xO_Y(OH)_Z$, AlO(OH) is contained in protective layer 9. The presence of such a compound can be detected by using surface analyses such as X-ray electron spectroscopy (XPS), Auger electron spectroscopy, Fourier transform infrared spectroscopy (FT-IR), and the like.

Moreover, the surface of current collector 4A provided with protective layer 9 has a physical state in which a large number of minute irregularities (not shown) of a molecule level and wedge-shaped holes (not shown) exist.

As shown in FIG. 3, anchor coat layer 10 containing conductive particles 11 and binder 12 is formed on protective layer 9. Conductive particles 11 are, for example, carbon black having high electric conductivity. As the carbon black, acetylene black, which is particularly stable in its structure and superior in electric conductivity, is desirably used. Other than the carbon black, graphite, thermally decomposable graphite, or the like may be used as long as it has high conductivity.

Binder 12 has a function to physically bind conductive particles 11 dispersed inside anchor coat layer 10 with one another. As a material of binder 12, a water soluble resin is particularly preferably used since water is used as a dispersant for the paste, a cellulose derivative, a rubber-based polymer, a thermoplastic resin, a thermosetting resin, and the like are preferably used. Specific examples thereof include carboxymethyl cellulose, polyvinyl alcohol, polyvinyl butyral, and the like.

Meanwhile, a weight ratio of conductive particles 11 with respect to binder 12 is set to 2 times or more and 10 times or less. The weight ratio is preferably set to 3 times or more and 6 times or less, more preferably, to 3 times or more and 5 times or less. When the weight ratio of conductive particles 11 is greater than 10 times, anchor coat layer 10 fails to retain a film shape. In contrast, when the weight ratio is less than 2 times, viscosity is high to cause difficulty in forming a film. When the weight ratio is within the above range, conductive particles 11 can be appropriately dispersed within anchor coat layer 10, and conductivity between current collector 4A and polarizing electrode layer 5A can be ensured by conductive particles 11.

As shown in FIG. 3, each of conductive particles 11 is partially embedded into protective layer 9. The average particle size of conductive particles 11 is greater than the thickness of protective layer 9. For example, the thickness of protective layer 9 is about 20 nm, and the average particle size of conductive particles 11 is about 35 nm. Therefore, as shown in FIG. 3, most of conductive particles 11 have only one portion thereof embedded, and the other portions are located within anchor coat layer 10.

As shown in FIGS. 2 and 3, polarizing electrode layer 5A is formed on anchor coat layer 10. As shown in FIG. 3, polarizing electrode layer 5A is formed by applying the powder of activated carbon 13 onto anchor coat layer 10. In FIG. 3, although polarizing electrode layer 5A is formed only by activated carbon 13, fine powder such as carbon black may be appropriately added thereto in addition to activated carbon 13. As activated carbon 13, more specifically, such materials formed by adding a gas such as water vapor and carbon dioxide to coconut husk carbon, charcoal, or the like to be activated may be used.

The average particle size of activated carbon 13 is, for example, 3 μm, which is larger than the average particle size (35 nm) of conductive particles 11. This relationship between particle sizes makes it possible to provide a structure in which a large number of conductive particles 11 surround one particle of activated carbon 13. For this reason, when anchor coat layer 10 is provided, the number of contact points between activated carbon 13 and conductive particles 11 becomes greater than the number of contact points between activated carbon 13 and current collector 4A when current collector 4A and polarizing electrode layer 5A are directly joined to each other. With this structure, boundary resistance between polarizing electrode layer 5A and current collector 4A can be reduced.

Moreover, as shown in FIG. 3, many particles of conductive particles 11 are thrust into gaps formed among particles of activated carbon 13 within polarizing electrode layer 5A. For this reason, an anchor effect is exerted between an inner circumferential surface of each of the gaps among the particles of activated carbon 13 and an outer circumferential surface of each of conductive particles 11 so that a joining strength between anchor coat layer 10 and polarizing electrode layer 5A is improved. In order to further increase the anchor effect, when the space occupied by each of the gaps is assumed to form a spherical shape, the average diameter is desirably made greater than the average particle size of conductive particles 11. This relationship between sizes allows conductive particles 11 to be thrust into the voids, thereby obtaining the anchor effect. In contrast, in the case where the average particle size of conductive particles 11 is larger than the average pore size of the voids, conductive particles 11 fail to be sufficiently thrust into the voids, failing to provide a sufficient anchor effect. Therefore, for example, in the case where the average particle size of conductive particles 11 is 35 nm, each of the voids is preferably made larger than 35 nm.

Moreover, by allowing conductive particles 11 to be thrust not only into the gaps, but also to the inside of each void of activated carbon 13 having a porous structure, an adhesion density between polarizing electrode layer 5A and anchor coat layer 10 can be increased. This function is obtained because conductive particles 11 are very small particles having an average particle size of several tens of nm. Thus, the contact resistance on the boundary between polarizing electrode layer 5A and anchor coat layer 10 can be reduced. For this reason, the average particle size of conductive particles 11 is preferably smaller than the pore diameter of voids on the surface of the activated carbon.

The following description will discuss effects of the electrode for capacitor according to the present exemplary embodiment. First, positive electrode 30A serving as the electrode for capacitor of the present exemplary embodiment makes it possible to improve adhesion of polarizing electrode layer 5A to current collector 4A. This is because positive electrode 30A has protective layer 9 formed on current collector 4A, and anchor coat layer 10 formed on protective layer 9.

As described above, conductive particles 11 of anchor coat layer 10 are pressed onto protective layer 9 to thrust thereinto by a pressure given at the time of applying a slurry to anchor coat layer 10, with the result that conductive particles 11 are partially embedded in anchor coat layer 10. There are many conductive particles 11 in this state. With this structure, the anchor effect is exerted between conductive particles 11 and current collector 4A so that the joining strength of anchor coat layer 10 to current collector 4A is increased. Moreover, as described earlier, anchor coat layer 10 and polarizing electrode layer 5A also have such a structure in which the joining strength therebetween is increased by the anchor effect. With these structures, the adhesion of polarizing electrode layer 5A to current collector 4A is improved.

One portion of each conductive particle 11 that is pressed to enter protective layer 9 and embedded therein is directly in contact with current collector 4A. Therefore, the conductivity between current collector 4A and activated carbon 13 is sufficiently maintained. Moreover, since the adhesion of polarizing electrode layer 5A to current collector 4A is superior as described earlier, the boundary resistance between current collector 4A and polarizing electrode layer 5A is reduced. Based upon these facts, the application of the electrode for capacitor according to the present exemplary embodiment makes it possible to reduce the internal resistance of the capacitor.

Moreover, protective layer 9 is formed over the entire surface of current collector 4A. For this reason, as compared with current collector 4A not provided with protective layer 9, the electrode for capacitor of the present exemplary embodiment is superior in corrosion resistance.

In the case of current collector 4A not provided with protective layer 9, an oxidized coat film is generated on the surface of current collector 4A as described earlier. However, since this oxidized coat film is generated by natural oxidation, the film is generated only partially or unevenly on current collector 4A. Consequently, on a portion that is not coated with the oxidized coat film of current collector 4A, corrosion progresses due to chemical reaction with an electrolytic solution with which capacitor element 1 is impregnated.

In contrast, in the present exemplary embodiment, since protective layer 9 containing an oxyhydroxide is formed over the entire surface of current collector 4A, corrosion caused by the contact between the electrolytic solution and current collector 4A can be effectively prevented. In particular, the oxyhydroxide is a compound that hardly reacts with acids or alkalis as compared with the oxide such as a naturally oxidized coat film. For this reason, it becomes possible to suppress corrosion caused by the contact between current collector 4A, and an acid or an alkali which is generated when pH of the electrolytic solution is changed.

In order to obtain the superior corrosion resistance described above, protective layer 9 desirably covers, as widely as possible, particularly the portion of the surface of current collector 4A which may make contact with the electrolytic solution. For example, protective layer 9 is preferably allowed to cover 70% or more of the surface area of current collector 4A.

In this manner, protective layer 9 containing the oxyhydroxide having a superior corrosion resistance is formed on the surface of current collector 4A. Moreover, conductive particles 11 contained in anchor coat layer 10 are embedded in protective layer 9. Thus, it becomes possible to ensure the conductivity between current collector 4A and conductive particles 11, and also to obtain the anchor effect.

Figure 4:
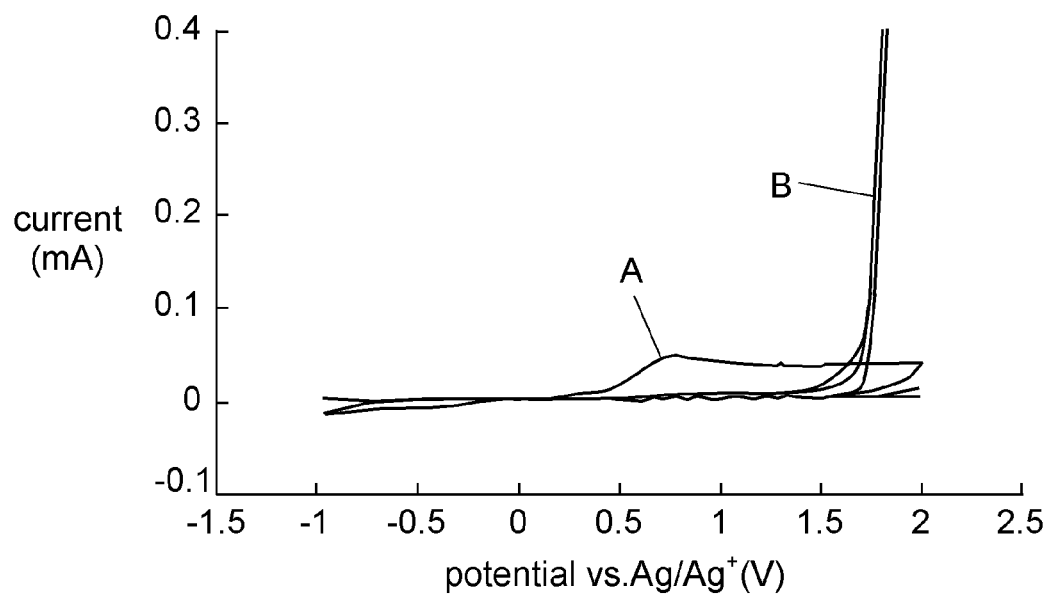
FIG. 4 is a cyclic voltammogram showing corrosion characteristics of the electrode shown in FIG. 2 and a plain foil.

Referring to FIG. 4, the following description will discuss the effect for reducing corrosion of the electrode for capacitor of the present exemplary embodiment. FIG. 4 is a cyclic voltammogram showing a corrosion characteristic of the electrode according to the present exemplary embodiment, and the vertical axis indicates a reaction current and the horizontal axis indicates a corrosion potential (potential difference measured on the basis of a reference electrode).

Upon measuring the corrosion characteristic of the electrode for capacitor, an electrochemical measuring method is used. In the present measurement, a three-electrode method is used, and more specifically, a silver/silver ion electrode for non-aqueous solvent is used as a reference electrode, a coil-shaped platinum line is used as a counter electrode, and positive electrode 30A of the electrode for capacitor of the present exemplary embodiment having a size of 2 cm×2 cm is used as a working electrode. These electrodes are connected to a potentiostat, immersed in an electrolytic solution, and the corrosion characteristic is measured with a potential scanning speed at 10 mV/min. As the electrolytic solution, a solution formed by allowing a mixed solvent containing EC and DMC at a ratio of 1:1 to contain $EDMI.BF_4$ at a concentration of 1.0 mol/l is used. Moreover, for comparison, a plain foil is used as the working electrode to measure the corrosion characteristic.

In the corrosion characteristic of the plain foil indicated by a solid line A in FIG. 4, a reaction current is detected at a potential in the vicinity of 0.3 V, and starts to increase. This indicates that the corrosion progresses in the plain foil at a potential of 0.3 V or more.

In contrast, the reaction current of positive electrode 30A indicated by a solid line B is not detected in the vicinity of 0.3 V where the reaction current of the plain foil is detected, and the reaction current is finally detected in the vicinity of 1.7 V or more, and starts to increase. This indicates that the corrosion progresses in positive electrode 30A at a potential of 1.7 V or more. In this manner, positive electrode 30A is greatly superior to the plain foil in corrosion resistance. Therefore, with the structure of the electrode for capacitor according to the present exemplary embodiment, corrosion can be reduced, and degradation of capacitor performance due to corrosion can be prevented for a long period of time.

Figure 5:
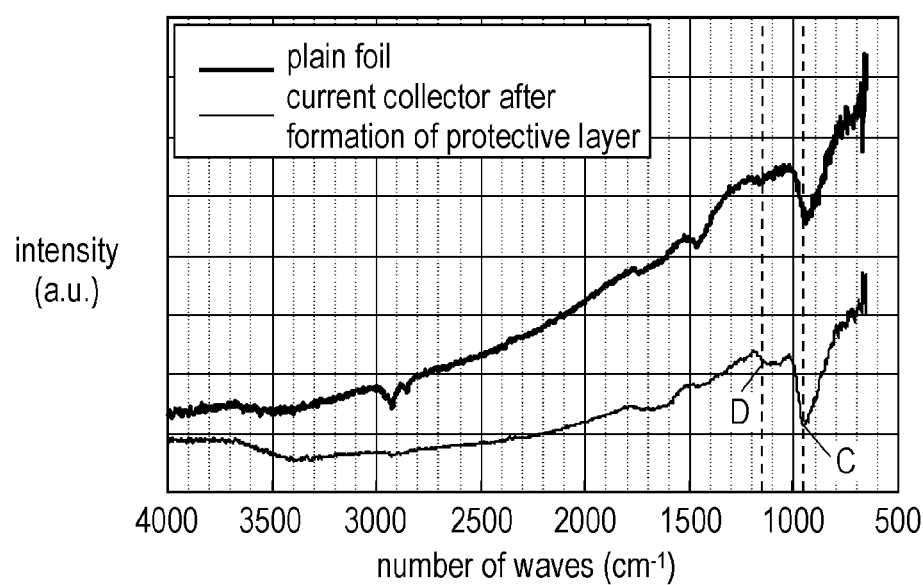
FIG. 5 is a graph showing a spectrum obtained by measuring a state of a protective layer of a current collector used in the electrode shown in FIG. 2 by using FT-IR.

Referring to FIG. 5, the following description will discuss results of measurements carried out to find the state of protective layer 9 by using the FT-IR. FIG. 5 is a graph showing a spectrum measured by using the FT-IR so as to find the state of protective layer 9 of current collector 4A. For comparison, the results of measurements carried out on a current collector made of a plain foil provided with no protective layer 9 are also shown. Based upon an ATR method (attenuated total reflectance method), measurements are carried out by using reflection of one time. Additionally, the contact angle of current collector 4A is 17°.

With respect to current collector 4A, peak C at 930 $cm^{-1}$ and peak D in a range of 1100 $cm^{-1}$ to 1200 $cm^{-1}$ are observed. Peak C indicates the presence of $Al_2O_3$, and peak D indicates, the presence of $Al_xO_y(OH)_z$, in particular, the presence of $\gamma$-$Al_xO_y(OH)_z$. In this case, a peak ratio D/C preferably falls in a range between 0.05 and 0.8, inclusive. The peak ratio D/C in this range allows an electrode for capacitor to have a small initial DCR (direct current resistance) and superior corrosion resistance.

When the peak ratio D/C is smaller than 0.05, the resistance to corrosion becomes weaker, and when the peak ratio D/C is greater than 0.80, the initial DCR becomes greater. In the example of FIG. 5, the peak ratio D/C of current collector 4A is 0.16. A discharge output at the time of corona discharge treatment, a period of time between the activation and the moisture contact, which will be described later, and the like relate to the peak ratio D/C. In the case where the output is high and the period of time is short, the peak ratio D/C becomes greater.

Since the surface of current collector 4A thus provided with protective layer 9 is greatly improved in wettability, an aqueous paste can be effectively applied thereto so that the productivity of the capacitor can be improved. Moreover, by removing an oil component remaining on current collector 4A at the time of rolling by the corona discharge treatment, the DCR of the electrode for capacitor can be reduced.

Upon applying a slurry using water as a dispersion medium onto current collector 4A to form anchor coat layer 10, the contact angle of the surface of protective layer 9 with respect to water preferably falls in a range between 8° and 50°, inclusive. When the contact angle is less than 8°, the surface of current collector 4A is roughened due to physical collision at the time of the corona discharge treatment. As a result, when thin anchor coat layer 10 is formed by a uniformly applying process, irregularities tend to occur. In contrast, when the contact angle exceeds 50°, the effect of the oil component removal by the corona discharge treatment is insufficient. In any of the cases, the internal resistance of the capacitor is increased.

The thickness of anchor coat layer 10 formed on protective layer 9 preferably is 1.2 μm or less. Moreover, it is preferably 0.3 μm or more. When anchor coat layer 10 is thicker than 1.2 μm, the initial DCR is increased. This is presumably because due to thick anchor coat layer 10, the absolute amount of binder 12 increases, failing to be dispersed therein, with the result that the conductivity within anchor coat layer 10 is lowered. On the other hand, it is difficult to apply anchor coat layer 10 thinner than 0.3 μm by using the currently applicable coater. Therefore, when realization or the like is taken into consideration, the thickness of anchor coat layer 10 is preferably 0.3 μm or more. However, if a coater capable of forming a thinner coat film becomes available by a technical progress in the future, the present invention is not limited thereto. In other words, when the standard of the coating technique is not taken into consideration, the lower limit of the thickness is set to about the average particle size of conductive particles 11.

Moreover, the preferable range of the thickness of anchor coat layer 10 relates to a contact angle of the surface of current collector 4A with respect to water. The slurry used for forming anchor coat layer 10 contains water as a dispersion medium. By applying such a slurry onto current collector 4A having a low contact angle within the above range, conductive particles 11 and binder 12 can be dispersed more uniformly and enlarged over the surface of current collector 4A even if a limited amount of the slurry is used. As a result, anchor coat layer 10 having a thickness in the above range can be formed.

Thus, it is possible to form thin anchor coat layer 10 having superior conductivity over a wider area. Moreover, since anchor coat layer 10 is thin, the entire electrode for capacitor can be made thinner. Alternatively, the capacity density of capacitor element 1 can be improved.

The average density of anchor coat layer 10 is set to 0.4 g/cm² or more. In the case where the weight mixing ratio of conductive particles 11 and binder 12 is set at 4:1 as described earlier, the average density of anchor coat layer 10 can be increased to about 0.6 g/cm², and in the case where the mixing ratio is set at 10:1, the average density thereof can be increased to about 2.1 g/cm². This effect is obtained by the fact that protective layer 9 is formed by subjecting current collector 4A to the corona discharge treatment. In other words, since the wettability is improved by subjecting current collector 4A to the corona discharge treatment, affinity between current collector 4A and the slurry to be used for coating anchor coat layer 10 is improved. That is, a slurry repellent property thereof can be lowered. As a result, it is possible to form anchor coat layer 10 with a high density. In this manner, in the present exemplary embodiment, current collector 4A and polarizing electrode layer 5A are firmly joined to each other, with anchor coat layer 10 having a high density of 0.4 g/cm³ or more.

The average density can be obtained in the following manner. One portion of the electrode for capacitor of the present exemplary embodiment extracted as a sample is measured in its weight, and by subtracting the weight corresponding to the portion of current collector 4A from the weight of this sample, the weight of anchor coat layer 10 is calculated. Consequently, the average density can be calculated based upon the thickness and the area of the sample.

Meanwhile, with respect to the oxyhydroxide contained in protective layer 9, the above effects can be sufficiently obtained as long as any one of oxyhydroxides is used. However, when charging and discharging processes of the capacitor are repeated, current collector 4A reacts with the electrolytic solution, with the result that the constituent ratios of the compositions forming protective layer 9 are changed over time. For this reason, after the capacitor has been used for a long period of time, in current collector 4A, compounds represented by $Al_X(OH)_Y$ are generated by pH variations in the electrolytic solution, or at least any of compounds represented by $Al_XF_YO_Z$, $Al_XF_Y(OH)_Z$, $Al_XF_Y$, and $Al_XO_Y(OH)_ZF_W$ are generated by a fluorine source such as anions in the electrolytic solution. Therefore, after having been used for a long period of time, protective layer 9 has a structure in which any of the compounds, such as $Al_XF_YO_Z$, $Al_XF_Y(OH)_Z$, or the like, are contained. Moreover, since an aluminum fluoride compound is chemically stable in an organic solvent-based electrolytic solution, upon forming anchor coat layer 10 as described earlier, a compound containing fluorine atoms may be preliminarily mixed in the slurry. In this case, protective layer 9 has a structure containing any of the compounds, such as $Al_X(OH)_Y$, $Al_XF_YO_Z$, $Al_XF_Y(OH)_Z$, and the like, at the time when the capacitor is assembled or from the initial time.

The average thickness of protective layer 9 is preferably made smaller than the average particle size of conductive particles 11. In this structure, since the average particle size of conductive particles 11 is larger than the thickness of protective layer 9, conductive particles 11 are comparatively easily made in contact with current collector 4A that is disposed beneath protective layer 9 when conductive particles 11 are embedded in protective layer 9. As a result, the conductivity between current collector 4A and polarizing electrode layer 5A is reliably ensured, and an electrostatic capacitance can be sufficiently exerted by reducing the resistance. For this reason, the average thickness of protective layer 9 is preferably 20 nm, and the average particle size of conductive particles 11 is preferably 35 nm, for example.

Even in the case where the average thickness of protective layer 9 is larger than 50% of the diameter of each conductive particle 11, the conductivity between current collector 4A and polarizing electrode layer 5A can be ensured, and the anchor effect can also be obtained. For example, conductive particles 11 may be embedded in protective layer 9 in such a state that conductive particles 11 are connected to one another in beaded form.

Moreover, the average thickness of protective layer 9 is preferably 10 nm or more. In general, the average thickness of a natural oxidized coat film formed on current collector 4A through natural oxidization in the air is about several nm. Even in the case where conductive particles 11 are embedded in a thin passive coat film such as this natural oxidized coat film, since the contact area between conductive particles 11 and the passive coat film is small, it is not possible to obtain an effective anchor effect. In contrast, in the case where the average thickness of protective layer 9 is set to 10 nm or more (for example, 20 nm as described above), it is possible to obtain a sufficient anchor effect so that the adhesion of polarizing electrode layer 5A with respect to current collector 4A can be improved.

The average thickness of protective layer 9 is preferably set to 50% or less of the average particle size of conductive particles 11, and the average particle size of conductive particles 11 is preferably made smaller than the average pore diameter of the voids of polarizing electrode layer 5A.

Meanwhile, the electrode for capacitor according to the present exemplary embodiment may be applied to various capacitors, such as an electric double layer capacitor, an electrochemical capacitor, and the like. For example, in the case of the electric double layer capacitor, current collector 4A serving as a first current collector and current collector 4B serving as a second current collector are, for example, made of aluminum. The first protective layer is formed on current collector 4A and the first anchor coat layer containing conductive particles is formed on the first protective layer. Moreover, polarizing electrode layer 5A serving as the first polarizing electrode layer is formed on the first anchor coat layer. On the other hand, the second protective layer is formed on current collector 4B, and the second anchor coat layer containing conductive particles is formed on this second protective layer. Polarizing electrode layer 5B serving as the second polarizing electrode layer is formed on the second anchor coat layer. Both of polarizing electrode layers 5A and 5B contain activated carbon.

In the case of the electrochemical capacitor, for example, current collector 4A is made of aluminum, current collector 4B is made of copper or nickel, and polarizing electrode layer 5A contains a material capable of adsorbing/desorbing ions such as activated carbon or the like. In place of polarizing electrode layer 5B, an active material layer capable of absorbing and discharging lithium ions is formed on current collector 4B of negative electrode 30B. The active material layer contains a carbon material, such as graphite or a silicon compound capable of forming an alloy with lithium ions. Moreover, lithium ions are contained in the electrolytic solution. A predetermined amount of lithium ions are absorbed in negative electrode 30B of the electrochemical capacitor so as to drop an electric potential.

The present exemplary embodiment has described the capacitor that uses capacitor element 1 formed by winding positive electrode 30A and negative electrode 30B with separators 6A and 6B being interposed therebetween. Alternatively, the electrode of the present exemplary embodiment may be applied to a positive electrode and/or a negative electrode of a capacitor element formed by stacking the positive electrode and the negative electrode, with a separator interposed therebetween. In this case, in place of case 2 and sealing member 3, the outer packaging body used for housing capacitor element 1 and the electrolytic solution may be formed by using, for example, an aluminum laminated film.

Moreover, the material of current collectors 4A and 4B are not limited to the metal mentioned above. For example, another structure may be used in which a metal film is formed on a surface of a base member, and the outer surface of the metal film is subjected to corona discharge treatment so that by breaking the bond to oxygen atoms of the metal forming the metal film, an oxyhydroxide is formed. In this case, the material for the base member is not limited to metal, and a carbon-based sheet, a resin film of an insulating material, or the like may be used. In other words, current collectors 4A and 4B are only required to have electrical conductivity, and at least their surfaces are preferably made of metal. Moreover, when the metal is a valve metal, protective layer 9 can be easily formed.

Figure 6:
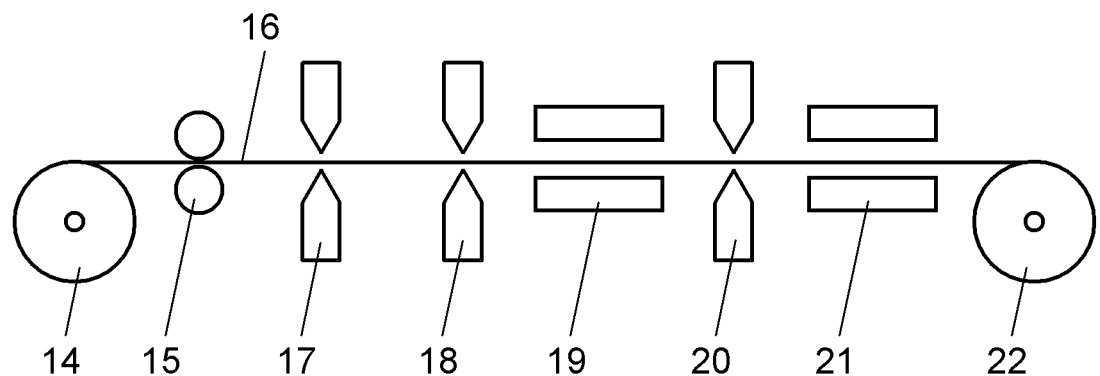
FIG. 6 is a conceptual view showing a device used for a process for producing the electrode for capacitor according to the present exemplary embodiment.

Referring to FIG. 6, the following description will discuss a process for producing the electrode for capacitor by the use of corona discharge treatment, as described above. FIG. 6 is a conceptual view showing a device used in the process for producing the electrode for capacitor of the present exemplary embodiment. Here, the process for producing positive electrode 30A will be described, however, the same applies to negative electrode 30B.

The device includes guide roller 15, corona discharge treatment unit 17, anchor coat layer forming unit 18, first drying unit 19, polarizing electrode layer forming unit 20, and second drying unit 21. Guide roller 15 draws current collector 4A out of wind-out roll 14 around which current collector 4A is wound into a reel shape, onto transport path 16, and after passing through the respective units, wind-up roll 22 winds positive electrode 30A that has been subjected to the treatments.

That is, guide roller 15 first draws current collector 4A out of wind-out roll 14 onto transport path 16, and transports current collector 4A at a predetermined velocity V (m/min). Current collector 4A transported from wind-out roll 14 reaches corona discharge treatment unit 17, and is subjected to activation treatment there.

In corona discharge treatment unit 17, two electrodes (not shown) are disposed with a gap of about 2 mm from each other, and these two electrodes are connected to a power supply (not shown). The power supply applies a high AC voltage to these electrodes. Upon application of a voltage of about 1 kV under the atmosphere, a weak current flows between the two electrodes by ionization so that a corona discharge is started. Corona discharge treatment unit 17 applies this corona discharge to current collector 4A. More specifically, the two surfaces of current collector 4A are subjected to the corona discharge treatment under conditions of a quantity of discharge of 20 W·min/m$^2$ or more and 350 W·min/m$^2$ or less, and a degree of discharge of 2 W/cm$^2$ or more and 350 W/cm$^2$ or less.

Provided that the width of the electrode in a direction perpendicular to transport path 16 is L (m), the discharge area of the discharge electrode is S (cm$^2$), the transferring velocity of current collector 4A is V (m/min), and the discharge power is P (W), the quantity of discharge and the degree of discharge are represented by the following equations:

(Quantity of discharge)=$P/(L \cdot V)$ (W·min/m$^2$)

(Degree of discharge)=$P/S$ (W/cm$^2$)

In this manner, when current collector 4A is subjected to the corona discharge treatment by corona discharge treatment unit 17, the bond between aluminum atoms and other atoms or molecules is cut off on its surface so that the surface of current collector 4A is activated. Since this activation forms an essential factor in moisture contact in the subsequent process, it is preferable to apply sufficient energy to current collector 4A by performing discharging process sufficiently by the corona discharge treatment or the like.

In this case, corona discharge treatment unit 17 has two electrodes, however, another structure may be used in which one of electrodes is formed into a roll shape, and the corona discharge treatment may be carried out while transporting current collector 4A by rotating this electrode.

After the surface of current collector 4A is activated, current collector 4A immediately reaches anchor coat layer forming unit 18. In anchor coat layer forming unit 18, a slurry (not shown) formed by adding water as a dispersion medium to conductive particles 11 and binder 12 is applied onto current collector 4A so that anchor coat layer 10 is formed thereon.

Prior to preparing this slurry, it is preferable to carry out a dispersing process of conductive particles 11 and binder 12 without using a dispersion medium such as a ball mill. With this dispersing process, it is possible to prevent conductive particles 11 from being damaged by the dispersion medium, and consequently to mutually disperse conductive particles 11 and binder 12, with superior conductivity of conductive particles 11 being maintained. As the dispersing process without using the dispersion medium, for example, a process is proposed in which by using a planetary mixer, a jet mill, a pressure homogenizer or the like, only conductive particles 11 and binder 12 are put therein and dispersed.

Water contained in the slurry is allowed to react with the surface of current collector 4A modified in corona discharge treatment unit 17 so that protective layer 9 containing an oxyhydroxide is formed on the surface of current collector 4A. That is, upon forming anchor coat layer 10, water contained in the slurry is allowed to react with the surface of current collector 4A that is chemically activated. In this manner, the step of forming anchor coat layer 10 also serves as a moisture contacting step of the steps of forming protective layer 9.

Metal atoms on the surface of current collector 4A, cut off from the bond to oxygen atoms, are chemically unstable, and are consequently chemically activated. These metal atoms are easily combined with atoms or molecules located close to the metal atoms because the metal atoms tend to return to their stable state. For example, the metal atoms are combined with oxygen atoms to form a metal oxide again. For this reason, the moisture contacting step is preferably carried out without a lapse of time after the end of the activation step.

For example, the moisture contacting step is preferably carried out within one minute from the completion of the activation step. Accordingly, the protection layer forming step is completed, and protective layer 9 containing $Al_xO_Y(OH)_Z$ as an oxyhydroxide can be formed in a stable manner.

As the process for applying the slurry, for example, the following process is proposed. Over a cell (not shown) storing the slurry, a rotatable roll (not shown) is disposed, and a lower end surface of this roll is immersed in the slurry in the cell. Then, this roll is rotated so that the lower surface of current collector 4A transported on an upper end face of the roll is made in contact with the slurry applied onto the roll. In particular, when the roll is rotated in a direction opposite to the transporting direction of current collector 4A, the slurry can be more effectively applied to current collector 4A. In this process, only the lower surface of current collector 4A is coated, however, as a process for coating the upper surface, another process is proposed in which a reversing roll (not shown) is installed in the middle of transport path 16, and an advancing direction of current collector 4A is reversed so that current collector 4A can be vertically turned over. Accordingly, the slurry can be applied to the both surfaces of current collector 4A by using the above process. In addition to the above composition, the slurry may have a composition containing fluorine.

Current collector 4A that has passed through anchor coat layer forming unit 18 is dried in first drying unit 19. After passing through first drying unit 19, current collector 4A reaches polarizing electrode layer forming unit 20. In polarizing electrode layer forming unit 20, second slurry containing activated carbon 13 is applied so that polarizing electrode layer 5A is formed on anchor coat layer 10.

Finally, the current collector is again dried by second drying unit 21 and positive electrode 30A is completed. Thereafter, positive electrode 30A is wound by wind-up roll 22 into a reel shape. Positive electrode 30A, that is, the electrode for capacitor of the present exemplary embodiment produced by this production process, is superior in adhesion of polarizing electrode layer 5A to current collector 4A.

As described earlier, the corona discharge treatment is preferably carried out under conditions where a quantity of discharge is set between 20 W·min/m$^2$ and 350 W·min/m$^2$, inclusive, and a degree of discharge is set between 2 W/cm$^2$ and 350 W/cm$^2$, inclusive. In the case where the quantity of discharge is smaller than 20 W·min/m$^2$ or the degree of discharge is smaller than 2 W/cm$^2$, the effect of activation of the surface of current collector 4A exerted by the corona discharge treatment is poor. On the other hand, in the case where the quantity of discharge is greater than 350 W·min/m$^2$ or the degree of discharge is greater than 350 W/cm$^2$, current collector 4A is heated upon carrying out the corona discharge treatment, with the result that the strength is lowered. After the corona discharge treatment, a pressure is applied to current collector 4A in order to form anchor coat layer 10 in anchor coat layer forming unit 18. For this reason, it is important to maintain the quantity of discharge at 350 W·min/m$^2$ or less and the degree of discharge at 350 W/cm$^2$ or less so as to maintain the strength of current collector 4A.

At that time, as described earlier, the corona discharge treatment is preferably carried out once or a plurality of times while confirming so as to control the contact angle of current collector 4A with respect to water to be set in a range between 8° and 50°, inclusive.

In the above description, the activation step is carried out under the atmosphere. However, in order to reduce generation of ozone, the activation step may be carried out under an inert gas atmosphere, such as a nitrogen gas or argon gas atmosphere while reducing the oxygen gas.

Moreover, as a coat film composition for an aluminum surface, in order to obtain a coat film having a structure containing any of the above compounds, such as $Al_x(OH)_Y$, $Al_xF_YO_Z$, $Al_xF_Y(OH)_Z$, described above, the gas composition during the corona discharge may be prepared as a mixed gas of an inert gas and a fluorocarbon gas. For example, $Ar/CF_4$, $N_2/CF_4$, $Ar/C_2F_6$ or the like is preferably used. Instead of the mixed gas of an inert gas and a fluorocarbon gas, a mixed gas containing an oxygen gas of about 20% or less in a volume ratio and a fluorocarbon gas may be used. For example, a mixed gas of the air and $CF_4$ may be used. Alternatively, instead of the fluorocarbon gas, $COF_2$ may be mixed in a range between 0.1% and 10% as a supply source for fluorine atoms. More preferably, the mixed rate is set in a range between 0.1% and 5%. As described above, the surface of current collector 4A is preferably subjected to the corona discharge treatment under the atmosphere containing a gas having fluorine atoms in its molecules so that the surface of current collector 4A is activated.

Figure 7:
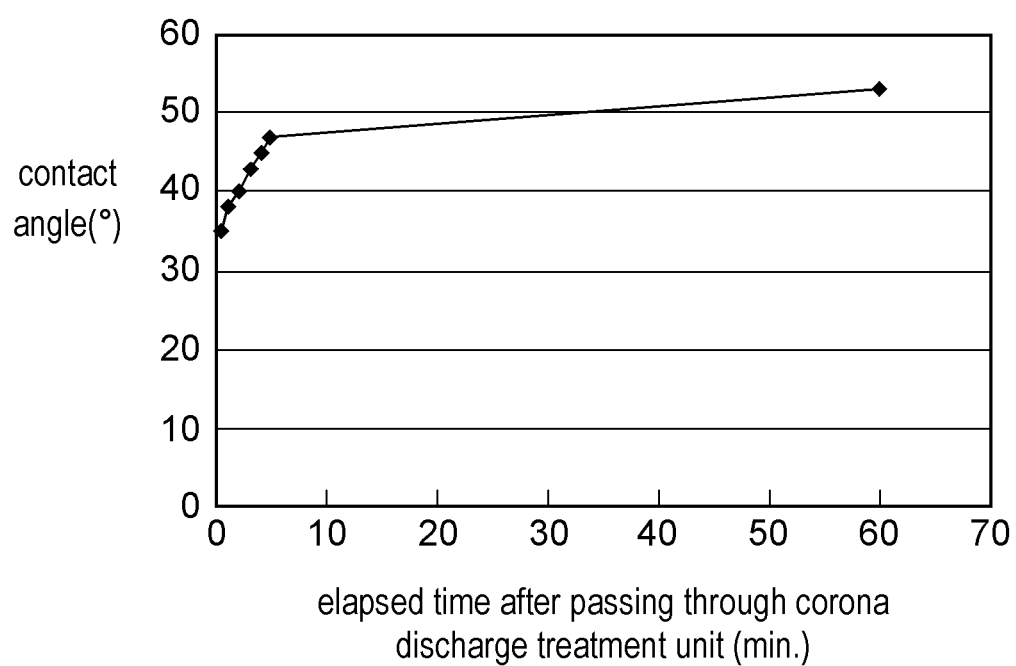
FIG. 7 is a graph showing a relationship between an elapsed time and a contact angle of the surface of a current collector with respect to water after activation of the current collector to be used for the electrode shown in FIG. 2.
Figure 8:
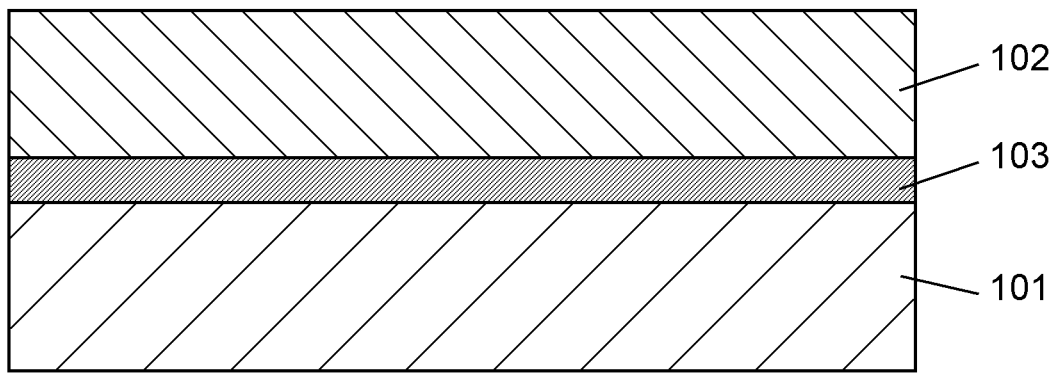
FIG. 8 is a schematic sectional view of a conventional electrode for capacitor.

FIG. 7 is a graph showing a relationship between the elapsed time after the activation step of current collector 4A and a contact angle of the surface of current collector 4A with respect to water. The activation is carried out with the quantity of discharge of 200 W·min/m$^2$ and the degree of discharge of 7 W/cm$^2$.

It can be seen that current collector 4A that has been chemically activated through the activation step gradually loses its surface activating effect as the time from the activation step is elapsed. It can be seen that in particular, within 10 minutes immediately after the completion of the activation step, a drastic change occurs. Base upon this fact, it is preferable to continuously carry out the moisture contacting step after the completion of the activation step, and in particular, in the attempt to suppress the change, it is preferable to proceed to the moisture contacting step within one minute after the completion of the activation step as described above.

In the present exemplary embodiment, the description has been given by exemplifying a process for producing protective layer 9 and anchor coat layer 10 on both of the surfaces of current collector 4A, however, the present invention is not limited thereto. The above production process may be applied to a case in which protective layer 9 and anchor coat layer 10 are formed only on one of the surfaces of current collector 4A.

Moreover, in the present exemplary embodiment, the description has been given by exemplifying a procedure in which the moisture contacting step and the anchor coat layer forming step are carried out simultaneously, however, the present invention is not limited to this process. The moisture contacting step may be separately carried out from the anchor coat layer forming step.

The following description will discuss preferable numeric value ranges of the electrode for capacitor according to the present exemplary embodiment using specific examples. Unless otherwise specified, the capacitor characteristics are confirmed by using capacitors produced under the following conditions. By using an aluminum plain foil having a size of 2 cm×2 cm, each of current collectors 4A and 4B is prepared. Positive electrode 30A and negative electrode 30B serving as the electrodes for capacitors are produced by using such current collectors 4A and 4B.

The thickness of polarizing electrode layer 5A is set to 40 μm, and the thickness of anchor coat layer 10 is set to 0.6 μm. The thickness of protective layer 9 is set to 20 nm. The mixed ratio of conductive particles 11 in anchor coat layer 10 is set to 4 times as large as binder 12. Carboxymethyl cellulose is used as binder 12. The average particle size of conductive particles 11 is 35 nm. Polarizing electrode layer 5A is formed of phenol resin-based activated carbon, acetylene black serving as a conductive aid, and carboxymethyl cellulose serving as the binder. The weight ratio of the activated carbon, the conductive aid, and the binder is set to 10:2:1.

As separator 6A, a nonwoven cloth made of cellulose having a thickness of 35 μm is used. Positive electrode 30A and negative electrode 30B thus produced are stacked with separator 6A being interposed therebetween, and after having been impregnated with an electrolytic solution, this is sealed with butyl rubber to produce a model cell. As the electrolytic solution, a solution is used, which is prepared by adding $EDMI.BF_4$ at a concentration of 1.0 mol/l to a solvent in which EC and DMC are mixed at a ratio of 1:1.

First, the following description will discuss the result of examination of the peak ratio of D/C between peak C indicating the presence of $Al_2O_3$ and peak D indicating the presence of $Al_xO_y(OH)_z$ in the protective layer 9. While the peak ratio D/C is varied in a range between 0.02 and 0.98 by changing a discharge output applied upon carrying out corona discharge treatment on each of current collectors 4A and 5A and the period of time between the activation and moisture contact, model cells are formed. In these cases, the contact angle is 17°. Table 1 shows an initial value of DCR, and a rate of increase of DCR when left for 200 hours with no load being applied thereto at 85° C. (in a state where no electric double layers are formed in each of the positive electrode and negative electrode). In order to measure the DCR, the cell is charged by applying a voltage having 2.5 V with 10 mA, a resistance value when the cell is discharged at 10 mA is measured.

TABLE 1

| Peak Ratio D/C | Initial DCR (mΩ) | DCR rate of increase (%) |
| --- | --- | --- |
| 0.02 | 0.7 | 143 |
| 0.05 | 0.8 | 15 |
| 0.20 | 0.8 | 10 |
| 0.70 | 0.9 | 11 |
| 0.80 | 1.2 | 13 |
| 0.85 | 2.9 | 12 |
| 0.98 | 8.7 | 20 |

As clearly indicated by Table 1, in the case where the peak ratio D/C is smaller than 0.05, the main component of protective layer 9 is $Al_2O_3$. In this case, although the conductivity is ensured, the DCR is remarkably increased due to high-temperature storage. This is considered to be caused by the fact that since $Al_2O_3$ is comparatively porous, the electrolytic solution and current collectors 4A and 5A react with each other. In contrast, in the case where comparatively dense $Al_xO_y(OH)_z$ is increased in protective layer 9, upon application of a high electric field to protective layer 9, the electron conductivity of protective layer 9 is lowered. For this reason, in the case where the peak ratio D/C exceeds 0.80, the initial DCR becomes larger. Therefore, it is considered that by allowing both of $Al_2O_3$ and $Al_xO_y(OH)_z$ to appropriately exist in a mixed state in protective layer 9, both of good conductivity and corrosion resistance are satisfied. More specifically, the peak ratio D/C is preferably set in a range between 0.05 and 0.80. More preferably, the peak ratio D/C is set in a range between 0.20 and 0.70.

The following description will discuss the results of examinations carried out on the contact angle of each of current collectors 4A and 5A with respect to water. By changing conditions upon performing corona discharge treatment on each of current collectors 4A and 5A, the contact angle is varied in a range between 4° and 58°, and model cells are produced. In these cases, the peak ratio D/C is 0.16. Table 2 shows the results of examinations carried out on a relationship between the capacitor characteristic and the contact angle of the current collector 4A with respect to water. More specifically, a rate of increase of the DCR is measured after the elapsed time of 192 hours, with an unloaded state at 80° C. being kept. The DCR is measured by using the same method used for evaluating the relationship between the peak ratio D/C and the DCR.

Upon measuring the contact angle, a θ/2 method is used. In the θ/2 method, the contact angle is obtained from an angle of straight lines connecting lateral end points of a droplet and an apex thereof, with respect to the surface of a solid matter. As evaluation conditions, a water droplet of 1 to 2 μL is dropped on the surface of current collector 4A, and a contact angle obtained after a lapse of 30 seconds when the enlarged water droplet is stabilized to a certain degree is adopted.

TABLE 2

| contact angle (°) | DCR rate of increase (%) |
| --- | --- |
| 58 | 1032.4 |
| 53 | 200.3 |
| 50 | 10.8 |
| 43 | 7.6 |
| 17 | 23.0 |
| 8 | 18.2 |
| 4 | 213.1 |

As clearly indicated by Table 2, in the case where the contact angle is between 8° and 50°, the change of the DCR with time is suppressed. However, in the cases where the contact angle is 58°, 53°, and 4° which are located out of the range, the DCR is remarkably increased. Accordingly, the contact angle of the surface of the current collector 4A with respect to water is preferably set between 8° and 50°, inclusive.

The following description will describe the results of examinations carried out on the thickness of anchor coat layer 10. By changing the thickness of anchor coat layer 10 in a range between 0.3 μm and 2.7 μm, model cells are produced. The other conditions are the same as those described earlier. Table 3 shows the results of examinations carried out on the relationship between the thickness of anchor coat layer 10 and the capacitor characteristic. That is, by using the electrodes for capacitors having anchor coat layers 10 with different thicknesses, capacitors are produced, and examinations are carried out on the relationship between the thickness of anchor coat layer 10 and the initial DCR value of the capacitor. In this case, the contact angle of the surface of current collector 4A is 17°, and the peak ratio D/C is 0.16.

For comparison, there is also produced a capacitor including an electrode for capacitor having neither anchor coat layer 10 nor protective layer 9, and the initial DCR value is measured. In this case, current collector 4A is not subjected to corona discharge treatment.

TABLE 3

| Thickness (μm) | Initial DCR rate (%) |
| --- | --- |
| 2.7 | 349.4 |
| 1.5 | 102.4 |
| 1.2 | 72.3 |
| 0.9 | 71.1 |

TABLE 3-continued

| Thickness (μm) | Initial DCR rate (%) |
|---|---|
| 0.6 | 63.9 |
| 0.3 | 69.9 |
| No | 100 |

In Table 3, provided that the initial DCR value of the capacitor including the electrode for capacitor having neither anchor coat layer 10 nor protective layer 9 is 100%, the initial DCR value of each of the other capacitors is indicated by a percentage. In this case, the DCR is measured by using the same method used for evaluating the relationship between the peak ratio D/C and the DCR.

As clearly indicated by Table 3, in the case where the thickness of anchor coat layer 10 is larger than 1.2 μm, the initial DCR is increased. Therefore, the thickness of anchor coat layer 10 is preferably set larger than 0 μm and 1.2 μm or less.

INDUSTRIAL APPLICABILITY

According to the present invention, the adhesion between the current collector and the polarizing electrode layer of an electrode for capacitor can be improved so that the internal resistance of the capacitor including the electrode for capacitor of the present invention can be reduced. Moreover, the reliability of the capacitor is enhanced. Therefore, the capacitor including the electrode for capacitor of the present invention is expected to be desirably applied to automobiles, various kinds of electronic devices, electric devices, and industrial devices.

The invention claimed is:

1. An electrode for capacitor, comprising:
a current collector having conductivity;
a protective layer formed on the current collector and containing an oxyhydroxide;
an anchor coat layer formed on the protective layer and containing conductive particles; and
a polarizing electrode layer formed on the anchor coat layer,
wherein at least a surface of the current collector is made of aluminum,
the oxyhydroxide is represented by a composition formula $Al_XO_Y(OH)_Z$, where X, Y, and Z are any natural numbers, and
a ratio D/C between a peak C indicating presence of $Al_2O_3$ and a peak D indicating presence of $Al_XO_Y(OH)_Z$ in the protective layer ranges from 0.05 and 0.8, inclusive where the peaks can be obtained upon carrying out measurements on the protective layer by using Fourier transform infrared spectroscopy.

2. The electrode for capacitor according to claim 1, wherein the protective layer further contains at least one of compounds represented by composition $Al_X(OH)_Y$, $Al_XF_YO_Z$, $Al_XF_Y(OH)_Z$, $Al_XF_Y$, and $Al_XO_Y(OH)_ZF_W$, where X, Y, Z, and W are any natural numbers.

3. The electrode for capacitor according to claim 1, wherein the anchor coat layer has an average density of 0.4 g/cm3 or more.

4. The electrode for capacitor according to claim 1, wherein the anchor coat layer has a thickness of 1.2 μm or less.

5. The electrode for capacitor according to claim 1, wherein the current collector including the protective layer has a surface whose contact angle with respect to water is in a range between 8° and 50°, inclusive.

6. A capacitor comprising:
a capacitor element having a positive electrode, a negative electrode, and a separator that is interposed between the positive electrode and the negative electrode;
an electrolytic solution with which at least the capacitor element is impregnated; and
an outer packaging body used for housing the capacitor element and the electrolytic solution, wherein
at least one of the positive electrode and negative electrode is the electrode for capacitor as defined in claim 1.

7. The capacitor according to claim 6, wherein
each of the positive electrode and the negative electrode includes the current collector, the protective layer, the anchor coat layer, and the polarizing electrode layer, the polarizing electrode layer containing activated carbon.

8. The capacitor according to claim 6, wherein
the positive electrode includes the current collector serving as a first current collector, the protective layer, the anchor coat layer, and the polarizing electrode layer containing activated carbon,
the negative electrode includes a second current collector and an active material layer that is formed on the second current collector and capable of absorbing and discharging lithium ions, and
the electrolytic solution contains lithium ions.

9. An electrode for capacitor, comprising:
a current collector having conductivity;
a polarizing electrode layer; and
an anchor coat layer formed between the current collector and the polarizing electrode layer, containing conductive particles, and having an average density of 0.4 g/cm$^3$ or more.

10. The electrode for capacitor according to claim 9, further comprising a protective layer formed between the current collector and the anchor coat layer, and containing an oxyhydroxide.

11. A capacitor comprising:
a capacitor element having a positive electrode, a negative electrode, and a separator that is interposed between the positive electrode and the negative electrode;
an electrolytic solution with which at least the capacitor element is impregnated; and
an outer packaging body used for housing the capacitor element and the electrolytic solution,
wherein at least one of the positive electrode and negative electrode is the electrode for capacitor as defined in claim 9.

12. An electrode for capacitor, comprising:
a current collector having conductivity;
polarizing electrode layer; and
a protective layer formed between the current collector and the polarizing electrode layer, and containing an oxyhydroxide,
wherein the current collector including the protective layer has a surface whose contact angle with respect to water is in a range between 8° and 50°, inclusive.

13. The electrode for capacitor according to claim 12, further comprising an anchor coat layer formed between the current collector and the polarizing electrode layer, containing conductive particles.

14. A capacitor comprising:
a capacitor element having a positive electrode, a negative electrode, and a separator that is interposed between the positive electrode and the negative electrode;

an electrolytic solution with which at least the capacitor element is impregnated; and
an outer packaging body used for housing the capacitor element and the electrolytic solution,
wherein at least one of the positive electrode and negative electrode is the electrode for capacitor as defined in claim 12.

* * * * *